A. HERING.
TEAPOT.
APPLICATION FILED DEC. 12, 1908. RENEWED NOV. 9, 1909.
945,388.  Patented Jan. 4, 1910.
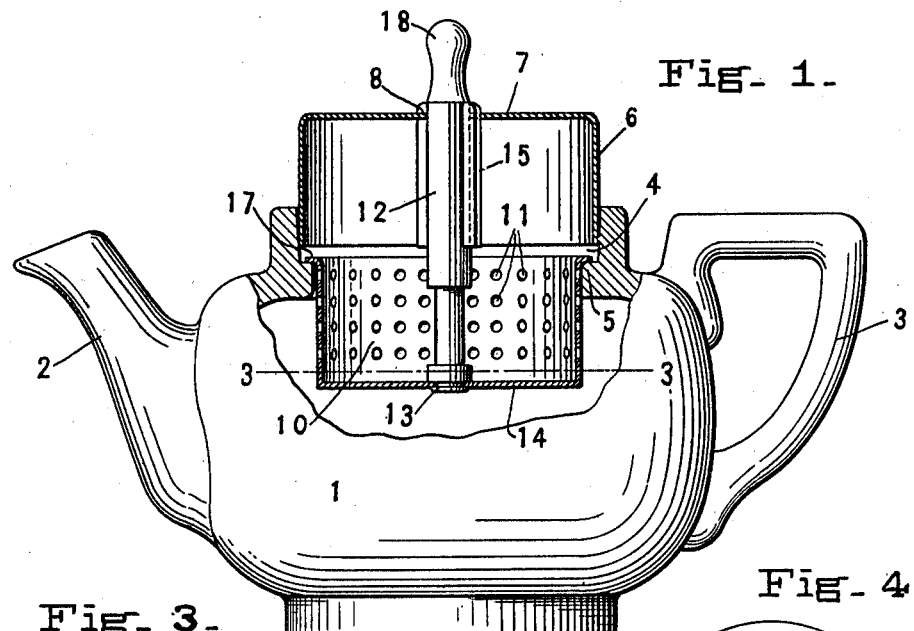
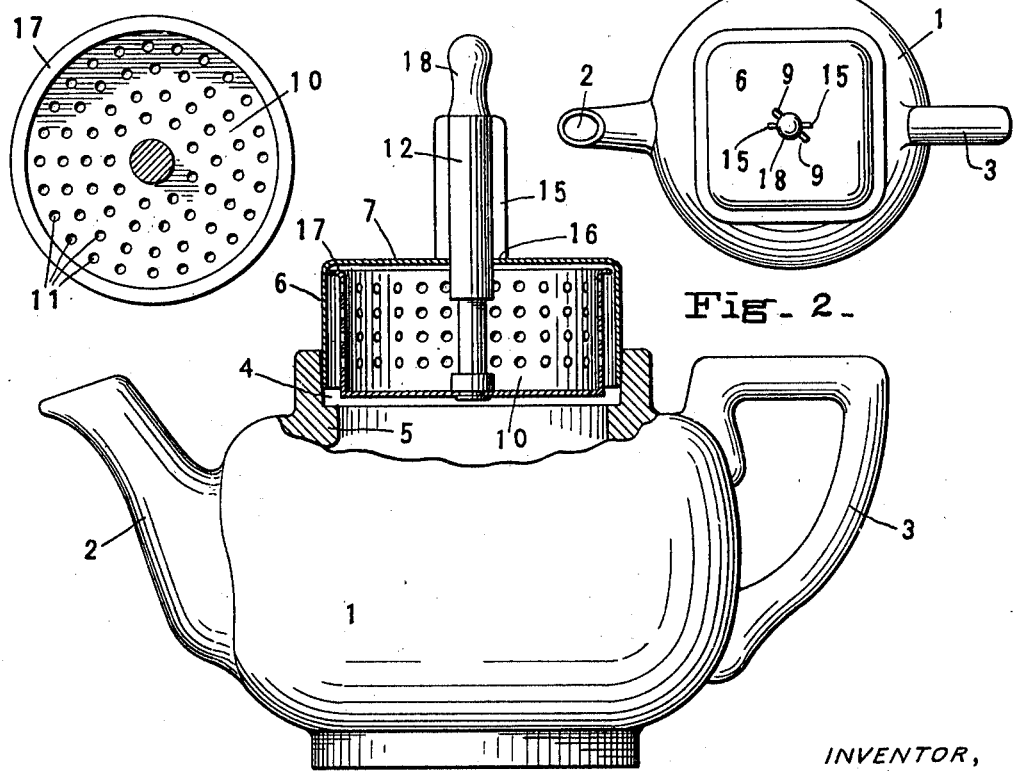
WITNESSES:
INVENTOR,
Ardo Hering,
BY
Frederick J. Allen
ATTORNEY.

UNITED STATES PATENT OFFICE.

ARDO HERING, OF NEW YORK, N. Y.

TEAPOT.

945,388.     Specification of Letters Patent.     Patented Jan. 4, 1910.

Application filed December 12, 1908, Serial No. 467,214. Renewed November 9, 1909. Serial No. 527,071.

*To all whom it may concern:*

Be it known that I, ARDO HERING, a citizen of the United States, and a resident of New York city, in the county of New York and State of New York, have invented certain new and useful Improvements in Teapots, of which the following is a specification.

This invention relates to infusion devices and one of the objects thereof is to provide a new and improved utensil of this character which will produce and infuse liquor of uniform strength or quality.

Another object of the invention is to provide a device such that a container for an infusion may be supported in position to permit of a ready and convenient immersion in the liquor, which container may be likewise withdrawn from the liquor when the latter is of the desired strength.

A further object is to provide a device of the above character which will prevent the escape of the aromatic properties of the infused liquor, but which may be readily removed when it is desired to refill or cleanse the liquor receptacle.

Other objects will be in part obvious and in part pointed out hereinafter.

With the above and other ends in view the invention accordingly consists in the features of construction, combinations of elements, arrangements of parts, and also in the several steps and the order and relation of one or more of the same to each of the others thereof, which will be exemplified hereinafter and the scope of the application of which will be indicated in the appended claims.

In the accompanying drawing, wherein is illustrated one of the various possible embodiments of my invention, Figure 1 is a view partly in side elevation and partly in section, showing the positions assumed by the parts when the container for the infusion is immersed in the liquor, Fig. 2 is a similar view showing the container supported in a position removed from the liquor, Fig. 3 is a view in horizontal section taken through the container on line 3—3, Fig. 1 and Fig. 4 is a top plan view of a receptacle with my improved infusion device mounted thereon, the receptacle in this instance, however, being provided with a substantially square opening, and the in-
fusion device being formed in correspondence therewith.

Similar reference characters refer to similar parts throughout the several views of the drawing.

Referring now to the drawing wherein my invention is illustrated as adapted for producing an infusion of coffee or tea, and for convenience of description the same will be described herein as adapted for producing an infusion of the latter, 1 designates a tea-pot, provided with the usual spout 2 and handle 3, said tea-pot being provided with the usual opening 4 in its upper portion. In the present instance an inwardly extending integral ledge 5 surrounds opening 4, the same being provided for a purpose which will be hereinafter described.

The numeral 6 denotes an open-ended casing, the open end of which is seated in opening 4 of the tea-pot, the upper wall 7 of said casing being provided with an opening 8, adjacent to which are formed slots or kerfs 9. A container 10 is located interiorly of casing 6 and is adapted to slide therein, said container being provided with a plurality of perforations 11 in its bottom and side walls. A stem 12 is journaled at 13 in the bottom wall 14 of the container, and extends upward through opening 8 of the casing. Stem 12 is provided with splines 15 which are adapted to be received in the kerfs 9. The splines engaging kerfs 9 act as guides for stem 12 when the same is reciprocated in opening 8. The lower ends 16 of splines 15 are so disposed with respect to the upper end of container 10 and the upper wall 7 of the casing that when the container is lifted to the position shown in Fig. 2, and said stem slightly rotated as shown in Fig. 4, they will rest upon the upper wall 7 and hold the container in such position.

Container 10, at its upper portion is provided with an outstanding flange 17 which is adapted to rest upon the ledge 5 of the receptacle or tea-pot 1, thus limiting the downward movement of the container and holding it immersed in the liquor within the receptacle or tea-pot. Stem 12 is preferably provided with a handle or knob 18 by means of which the same may be manipulated.

Having thus described the construction of this preferred embodiment of my invention, the manner of using the same, which should be largely obvious, may now be understood.

The liquid in which the infusion is to be made, is first poured into the receptacle, herein described as a tea-pot. The required quantity of tea is next placed in the container 10, such operation being effected by merely slipping the stem 12 downward through the opening 8, thereby entirely disconnecting these parts. After the tea has been inserted in the container, the parts are reassembled in a manner which will be obvious, and the casing is then seated in the opening 4 of the tea-pot. The normal position of the container with respect to the casing is illustrated in Fig. 2 of the drawing, in which position the stem 12 has been slightly rotated to carry the lower ends 16 of the splines 15 out of registry with the kerfs 9, whereby they are allowed to rest upon the upper wall of the casing to thereby hold the container in a position removed from the liquor contained in the tea-pot. In making the infusion, stem 12 is rotated to carry the splines 15 into registry with the kerfs 9 whereby said stem may be readily lowered to immerse the container in the liquor, the downward movement thereof being limited, by the engagement of the flange 17 with the ledge 5, as shown in Fig. 1. After an infusion of the desired strength has been made the container may again be lifted to the position shown in Fig. 2.

It will accordingly be seen that I have provided a utensil of the above character wherein is attained, among others, all the ends and objects above enumerated in a simple yet efficient manner. As will be obvious, this device provides for a diffused liquor of uniform strength, since, when the liquor is of the required strength, the container may be withdrawn therefrom and conveniently held in a position above the same without making it necessary entirely to disengage the container from the tea-pot.

Another advantage inherent in the above construction lies in the fact that the perforated container operates as a strainer, the liquor running through the perforation into the tea-pot and the tea leaves being retained therein. A further advantage accruing by reason of the present construction is that the container, not being allowed to remain in the liquor when the latter is of the desired strength, the objectionable effects of the tannin and other astringent properties of tea are entirely eliminated.

While I have shown my invention applied to a device adapted to produce an infusion of coffee or tea, it is obvious that infusions of various substances may be effected thereby without departing from the spirit or scope of the present invention. It will of course be obvious that the device may be formed to fit openings of various shapes and sizes.

As many changes could be made in the above construction and the manner in which the same is carried out, and many widely different embodiments of the mechanism could be utilized for carrying out such steps without departing from the scope of my invention, I intend that all matter contained in the above description or shown in the accompanying drawing shall be interpreted as illustrative and not in a limiting sense. I desire it also to be understood that the language used in the following claims is intended to cover all of the generic and specific features of my invention herein described and all statements of the scope of the invention which, as a matter of language, might be said to fall therebetween.

Having thus described my invention, what I claim as new and desire to secure by Letters Patent is:

1. In a device of the class described, the combination of a receptacle adapted to hold liquor, said receptacle being provided with an opening in its upper walls and having a ledge formed adjacent said opening, a casing seated in said opening and forming a closure therefor, a perforated container located within said casing and adapted to slide therein, a stem attached to said container which extends through the upper wall of the casing, guiding means provided upon said stem, and an outstanding flange provided upon said container adapted to rest upon said ledge and support the container when the same is lowered and immersed in liquor.

2. In a device of the class described, the combination of a receptacle provided with an opening in its upper wall and an inwardly extending ledge adjacent said opening, an open-ended casing seated in said opening, a perforated container located within said casing and adapted to be reciprocated with respect thereto, a stem for reciprocating said container which extends through the upper wall of the casing, guiding means upon said stem, and an outstanding flange upon the upper portion of said container which is adapted to engage with said ledge and limit the downward reciprocal movement of said container.

3. In a device of the class described, the combination with a suitable receptacle, provided with an opening in its upper portion and having a ledge surrounding said opening, an open-ended casing seated in said opening and forming a closure therefor, said casing having an opening in its upper wall, kerfs formed adjacent said opening, a perforated container adapted to slide within said casing, a stem attached to said container which extends upward through the opening in the casing, said stem having splines located in said kerfs, an outside flange formed upon the upper portion of said container, adapted to rest upon said ledge when the container is lowered into the receptacle and immersed in the liquor therein, said splines, when said container is moved upward within the casing and the stem slightly rotated being adapted to rest upon the upper wall of the casing and hold the container in a position removed from the liquor.

4. In a device of the class described, the combination of a receptacle adapted to hold a liquor to be infused, said receptacle having an opening in its upper portion and a ledge surrounding said opening, an open-ended casing seated in said opening and forming a closure therefor, a perforated container adapted to be reciprocated within said casing, a stem journaled in the bottom wall of the container which extends upward through the upper wall of the casing, a kerf formed in the upper wall of the casing, a spline carried by said stem which is received in said kerf, whereby said stem is guided, the lower end of said spline, when said container is moved to its uppermost position and said stem is rotated, being adapted to rest upon the upper wall of the casing and thereby hold the container in such a position, and an outstanding flange formed upon the upper portion of said container which is adapted to rest upon said ledge when said container is lowered within said receptacle and thereby limit the downward movement of said container.

5. In a device of the class described, the combination with a receptacle having an opening in its upper portion and a ledge projecting from the inner wall of said opening of a bottomless cover casing adapted to be seated within said opening upon said ledge, a perforated container adapted to slide within said casing, and having means for engaging said ledge when in its lowered position and other means for retaining it in its raised position within the casing.

6. In a device of the kind described, the combination with a receptacle having an opening in its upper portion, of a bottomless cover casing adapted to be seated within said opening, an open topped perforated container adapted to slide within said casing, means for reciprocating the container including means for holding it in its raised position within the casing, and means upon the container adapted to engage within said opening to limit the downward movement of the container.

ARDO HERING.

Witnesses:
   LEWIS S. HASLAM,
   FREDERICK I. ALLEN.